United States Patent Office 3,310,537
Patented Mar. 21, 1967

3,310,537
HYDROCARBON POLYMERS CONTAINING ETH-
YLENE, A HIGHER ALPHA-OLEFIN AND AT
LEAST TWO NON-CONJUGATED DIENES
Giulio Natta, Giorgio Mazzanti, Alberto Valvassori,
Guido Sartori, and Nazareno Cameli, all of Milan,
Italy, assignors to Montecatini Edison S.p.A., Milan,
Italy
No Drawing. Filed Apr. 22, 1963, Ser. No. 274,852
Claims priority, application Italy, Apr. 27, 1962,
8,364/62
10 Claims. (Cl. 260—79.5)

The present invention relates to a new class of vulcanizable substantially linear, amorphous, high molecular weight olefin copolymers and to a process for preparing them with the aid of catalysts acting with a co-ordinated anionic mechanism.

Certain unsaturated amorphous copolymers have been disclosed by our group, and more particularly amorphous copolymers of ethylene, one or more aliphatic alpha-olefins and a third monomer selected from non-conjugated cyclic olefins, alkenylcycloalkenes, dialkenylcycloalkanes, polyalkenylcycloalkanes.

It has never been suggested that copolymers could be prepared which have macromolecules containing at least two of the aforementioned classes of monomers, in addition to the monomeric units derived from ethylene and one or more of the alpha-olefins.

It has now been found, according to the present invention, that it is possible to prepare vulcanizable, high molecular weight, substantially linear, amorphous copolymers of one or more monomers selected from ethylene and aliphatic alpha-olefins having the general formula R—CH=CH$_2$ in which R is an alkyl group containing 1 to 6 carbon atoms and at least two monomers from two or more of the groups consisting of (1) non-conjugated cyclic dienes, (2) alkenyl cycloalkenes and (3) dialkenyl or polyalkenyl cycloalkanes. Thus these copolymerization products contain in each micromolecule monomeric units derive from each of the monomers used.

Among the monomers belonging to the class of non-conjugated cyclic dienes are included cycloheptadiene-1,4; cyclooctadiene-1,5; cyclooctadiene-1,4; cyclohexadiene-1,6; cyclododecadiene-1,7; 1-methyl-cyclooctadiene-1,5; 3-methylcyclooctadiene-1,5; and 3,4-dimethylcyclooctadiene-1,5.

Among the monomers belonging to the class of alkenyl cycloalkenes are included 1-vinylcyclohexene-1, 4-vinylcyclohexene-1, 1-hexene-5-allyl-cyclohexene-1, 3-methyl-4-allyl-cyclohexene-1, 1-buten-3-yl-cyclohexene-1, 1-allyl-cyclohexene-1, 3-buten-3-yl-cyclopentene-1, 1-penten-4-yl - cyclopentene-1, 3-methyl-1-buten-3-yl-cyclopentene-1, 2,3,3-trimethyl-4-vinyl-cyclopentene-1, 3,4 - dimethyl - 5-vinyl-cyclohexene-1, 3,5-dimethyl-4-vinylcyclohexene-1, 3-methyl-4-propen-1-yl-cyclohexene-1, 3-penten-4-yl-cyclopentene-1, 1,2-divinyl-cyclooctene-5, 1,2-divinyl-4,5-dimethyl-cyclohexene-4, 2-methyl-allyl cyclopentene-1.

Among the monomers belonging to class of di- and polyalkenyl cycloalkanes are included trans-1,2-divinylcyclobutane, cis-1,2-divinylcyclobutane, 1,2-divinylcyclopentane, trans - divinylcyclopropane, trans - 1,2 - divinylcyclohexane, trivinylcyclohexanes.

It is known that three typical members of the aforementioned classes of monomers, namely cis-cis cyclooctadiene-1,5, 4-vinylcyclohexene-1, and trans-1,2-divinylcyclobutane are present in variable proportions in the mixture obtained by thermal or catalytic dimerization of butadiene.

More particularly, by thermal dimerization of butadiene (see Reed, J. Chem. Soc. 685 (1951)), under suitable conditions a mixture can be obtained which contains:

| | Percent |
|---|---|
| 4-vinylcyclohexene-1 | 91 |
| Trans-1,2-divinylcyclobutane | 5 |
| Cis-cis cyclooctadiene-1,5 | 4 |

The catalytic dimerization of butadiene (See Reed, J. Chem. Soc. 1931 (1954); US Patents 2,686,208; 2,686,209; 2,964,575; 2,972,640; 2,991,317; 3,004,081 and British Patents 107,106 and 882,400) carried out under particular conditions on the contrary leads to mixtures containing:

| | Percent |
|---|---|
| 4-vinylcyclohexene-1 | 20–30 |
| Cis-cis-cyclooctadiene-1,5 | 70–80 |
| Divinylcyclobutane | <1 |

According to the present invention it has therefore been found unexpectedly that it is possible to copolymerize one or more monomers selected from the group of ethylene and aliphatic alpha-olefins with the mixtures of monomers obtained by thermal or catalytic dimerization of butadiene to obtain copolymers which contain, in each macromolecule, monomeric units derived from all of the monomers used. For instance, by the copolymerization of ethylene and propylene with a monomeric mixture obtained by thermal dimerization of butadiene containing cis-cyclooctadiene-1,5, 4-vinylcyclohexene-1 and trans-1,2-divinylcyclobutane, according to the present invention, a crude copolymerization product was obtained which consists of macromolecules each containing monomeric units, distributed at random, of ethylene, propylene, cyclooctadiene-1,5, 4-vinylcyclohexene-1 and trans-1,2 divinylcyclobutane.

This result is considered very unexpected, since from the theory of copolymerization, it is known that in case of ionic copolymerization, there are remarkable differences in the reactivity of the different monomers and, therefore in order to introduce into a copolymer amounts of one monomer comparable with those of another monomer, a very careful selection of their relative concentrations is required.

According to the present invention the whole butadiene dimerization mixture, purified by simple distillation of the non-dimerization fraction, can be used for the preparation of the copolymers within the need of isolating the various components in the pure state by processes of careful rectification, which are expensive.

A further advantage is the presence of vinylcyclohexene in the mixture of dimers used. In fact, although vinylcyclohexene does not reduce considerably the polymerization yields, it reduces the molecular weight and makes it possible to obtain copolymers having a sufficiently low Mooney viscosity and a good workability.

In addition to the mixtures obtained by thermal or catalytic dimerization of butadiene (in which, as mentioned above, the main components are cyclooctadiene-1, 5, 4-vinylcyclohexene-1 and 1, 2-divinylcyclobutane), mixtures obtained from a thermal dimerization mixture in various ratios, with a catalytic dimerization mixture which essentially consists of two of the three aforementioned dienes can be used. For instance, the low boiling fractions essentially contain trans-1, 2-divinylcyclobutane and 4-vinylcyclohexene-1, in various ratios, and the high boiling fractions essentially contain 4-vinylcyclohexene-1 and cis-cis cyclooctadiene-1,5 in various ratios.

The olefins which can be used in addition to ethylene in the preparation of the copolymers according to the invention are higher aliphatic alpha-olefins having the general formula R—CH=CH$_2$, wherein R is an alkyl group containing 1 to 6 carbon atoms, more particularly propylene and/or butene-1.

The copolymers of the present invention can be defined as copolymers having a practically homogeneous composition. The copolymers of the present invention have a molecular weight, determined viscosimetrically, higher than 20,000 corresponding to an intrinsic viscosity in excess of 0.5 as determined in tetrahydronaphthalene at 135° C., or in toluene at 30° C. (G. Moraglio "La Chimica e l'Industria" 41 10 (1959) 984–987). The intrinsic viscosity of the copolymers can vary from 0.5 up to 10 or higher. For most practical purposes copolymers having an intrinsic viscosity of between 1 and 5 are, however, preferred.

The homogeneousness of these copolymers is confirmed by the ease of obtaining well vulcanized products by adopting the techniques normally used for vulcanizing unsaturated rubbers preferably having a low unsaturation content, such as e.g., butyl rubber. This demonstrates that the unsaturations, and therefore the monomeric units deriving from the diolefins used, are well distributed along the chain.

The vulcanized products thus obtained (in distinction from the unvulcanized copolymers which are completely soluble in boiling n-heptane) are completely insoluble in organic solvents and are swollen only to a limited extent by some of the organic aromatic solvents. Moreover, the vulcanized rubbers thus obtained have a very good mechanical strength and a low permanent set at break.

The catalytic systems employable in the process of the present invention are highly dispersed or amorphous colloidally dispersed or completely dissolved in the hydrocarbons which are used as solvents for the monomers in the copolymerization; these include for example, n-heptane, benzene, toluene and mixtures thereof.

The catalysts are prepared by mixing organometallic compounds of aluminum or beryllium or lithium-aluminum complexes with vanadium compounds. More particularly, metal organic compounds such as aluminum trialkyls, aluminum dialkyl monohalides, aluminum monoalkyl-dihalides, aluminum alkenyls, aluminum alkylenes, aluminum cycloalkyls, aluminum cycloalkyl-alkyls, aluminum aryls, aluminum alkyl aryls, aluminum dialkylalkoxides and aluminum alkylalkoxyhalides, lithium-aluminum tetraalkyls, beryllium alkyls, beryllium alkylhalides, beryllium aryls or complexes of the aforementioned organic aluminum compounds with preferably weak Lewis' bases, and vanadium compounds are used in the preparation of the catalyst according to the process of this invention.

In order to obtain a narrow distribution of molecular weights, vanadium compounds which are soluble in hydrocarbons that are to be used as copolymerization solvents, are preferred.

Non-limitative examples of metal organic compounds which can be used in the preparation of the catalyst include aluminum triethyl, aluminum triisobutyl, aluminum trihexyl, aluminum diethylmonochloride, aluminum diethyl monoiodide, aluminum diethyl monofluoride, aluminum diisobutyl monochloride, aluminum monoethyldichloride, aluminum butenyl diethyl, aluminum isohexenyl diethyl, 2-methyl-1, 4-(diisobutyl aluminum)-butane, aluminum tri(cyclo-pentyl-methyl), aluminum tri(dimethyl cyclopentylmethyl), aluminum triphenyl, aluminum tritolyl, aluminum diphenyl monochloride, aluminum di(cyclopentylmethyl) monochloride, aluminum diisobutyl monochloride complexed with anisole, lithium-aluminum tetrahexyl, aluminum monochloro monoethyl-monoethoxide, aluminum diethylpropoxide, aluminum diethylamyloxide, aluminum monochloromono-propyl-monopropoxide, aluminum monochloromonopropylmonoethoxide, beryllium diethyl, beryllium methylchloride, beryllium dimethyl, beryllium di-n-propyl, beryllium diisopropyl, beryllium di-n-butyl, beryllium di t-butyl, and beryllium diphenyl.

The hydrocarbon soluble vanadium compounds which can be used in the preparation of the catalyst are halides and oxyhalides such as $VCl_4$, $VOCl_3$, $VBr_4$ and compounds in which at least one of the metal valences is saturated by a heteroatom (more particularly oxygen and nitrogen) bound to an organic group, such as vanadium triacetylacetonate, vanadium tribenzoylacetonate, vanadyl diacetylacetonate and halogen acetylacetonates, vanadyl trialkoxides and halogen alkoxides, tetrahydrofuranates, etherates, aminates, quinolinates and pyridinates of vanadium tri- and tetrachloride, and of vanadyl trichloride. Hydrocarbon-insoluble vanadium compounds selected from salts or organic acids, e.g., vanadium triacetate, tribenzoate or tri-stearate, can also be used in the preparation of the catalyst.

It was found that with vanadium halides and oxyhalides, all the aforementioned organometallic compounds can be used in the preparation of the catalyst. On the other hand, and as shown by the examples, vanadium compounds in which the metal valences are saturated with an oxygen or nitrogen atom bound to an organic group are mixed with halogen-containing organometallic compounds, to obtain the catalyst.

The copolymerization process according to the present invention can be carried out at temperatures ranging between —80° C. and +125° C. In instances where the catalysts are prepared from vanadium triacetylacetonate, vanadyl diacetylacetonate, vanadyl halogen acetylacetonates, and in general from a vanadium compound in the presence of aluminum alkyl halides, in order to obtain high productions of copolymer per weight units of catalyst used, both the preparation of the catalyst and the copolymerization are conveniently carried out at temperatures between 0° C. and —80° C. and preferably between —10° C. and —50° C.

By operating under these conditions the catalysts have a much higher activity than that of the same catalysts systems prepared at high temperatures. Moreover, by operating in the aforementioned range of low temperatures the catalyst activity remains practically unaltered with time.

If catalysts prepared from an aluminum alkylhalide and from vanadium triacetylacetonate, vanadyl trialkoxides or vanadyl halogenalkoxides at temperatures between 0° C. and 125° C. are used, in order to obtain high productions of copolymer, it is preferable to operate in the presence of particular complexing agents selected from the group consisting of ethers, thioethers, tertiary amines or trisubstituted phosphines containing at least one branched alkyl group or an aromatic nucleus.

The complexing agent can be an ether of the Formula RYR' in which Y is oxygen or sulfur and R and R' each represent a linear or branched alkyl group containing from 1 to 14 carbon atoms or an aromatic nucleus containing from 6 to 14 carbon atoms, one of R and R' being a branched alkyl group or an aromatic nucleus. The tertiary amines have the formula

wherein R, R' and R'' each represent an alkyl group containing from 1 to 14 carbon atoms, one of R, R' or R'' being an aromatic nucleus. The tertiary phosphines are

wherein R, R' and R'' each represent an alkyl radical containing from 1 to 14 carbon atoms or an aromatic nucleus containing from 6 to 14 carbon atoms, and at least one of the R, R' or R'' being an aromatic nucleus. The amount of complexing agent is preferably between 0.05 and 1 mole of aluminum alkyl halide.

The activity of the catalysts used in the process described varies with the molar ratio between the compounds used in the preparation of the catalyst. According to the present invention it has been found that when e.g., aluminum trialkyls and vanadium halides or oxyhalides are employed, catalysts in which the molar ratio of aluminum trialkyl to vanadium compound is between 1 and 5, and preferably between 2 and 4.

If, on the contrary, aluminum diethyl monochloride $(Al(C_2H_5)_2Cl)$ and vanadium triacetylacetonate $(VAc_3)$ are used, the best results are obtained with an $$Al(C_2H_5)_2Cl/VAc_3$$

molar ratio between 2 and 20, and preferably between 4 and 10.

The polymerization of the present invention can be carried out in the presence of a hydrocarbon solvent, selected from aliphatic, cycloaliphatic or aromatic hydrocarbons, such as butane, pentane, heptane, cyclohexane, toluene, xylene or their mixtures.

Particularly high productions of copolymer per catalyst unit, by weight, can be obtained if the copolymerization is carried out in absence of an inert solvent, by using the same monomers in the liquid state, e.g., in the presence of a solution of ethylene in the mixture of the alpha-olefins and of the dienes or polyenes to be copolymerized, in the liquid state.

Halogenated hydrocarbons which, under the polymerization conditions, do not react with the catalyst, e.g., chloroform, trichloroethylene, tetrachloroethylene, chlorobenzenes, etc. can also be used as the solvent.

In order to obtain copolymers having a high homogeneity of composition, the ratio between the monomers to be copolymerized in the reacting liquid phase should be conveniently kept constant or as constant as possible. For this purpose it can be convenient to carry out the copolymerization continuously by continuously feeding and discharging a monomers mixture having a constant composition and by operating at high special rates. The composition of the copolymers can be carried within wide limits by varying the composition of the monomers mixture.

In spite of the different reactivity of the various monomers which make up the butadiene-dimerization mixture, it is possible to obtain a copolymer containing monomeric units of each diolefin present in the same relative ratios corresponding to the raw dimerization mixture, if the process is carried out continuously by feeding to the reactor an amount of dimers mixture corresponding to the amount to be introduced into the copolymer, and if all the non-polymerized dimers are recycled.

By operating under these conditions a variation in the composition of the copolymer occurs only at the beginning of the polymerization but a constant composition is obtained when stationary conditions are reached.

Due to the lower reactivity of dienes with respect to ethylene and propylene, these stationary conditions correspond to a very high concentration of diolefins. For instance, in order to obtain a copolymer having a total diene molar content of 5% when using a mixture obtained by thermal dimerization of butadiene, it is necessary to operate under a pressure of about room pressure with a feeding mixture having a ratio of about:

$$\frac{\text{diolefin total mols}}{C_2H_4 \text{ mols} + C_3H_6 \text{ mols}}$$

in the liquid phase between 1:1 and 40:1.

Due to the lower reactivity of diolefins it is possible to obtain copolymers having the desired composition, also by feeding the diene mixture batchwise, e.g. by first introducing into the reactor an excess of dienes solution and then feeding continuously the ethylene-alpha olefins mixture under the desired pressure needed in order to obtain a copolymer having the desired composition. Since the reactivity of propylene is remarkably lower than that of ethylene, copolymers having the desired composition can also be obtained by feeding the reactor with an excess of a solution of dienes and propylene and then regulating the ethylene pressure and the temperature so as to obtain the desired composition of the copolymer.

Another possible method consists of feeding first a monomer mixture containing the components in such a ratio as to give a copolymer in which the dienes are present in the same relative concentrations as those of the dimerization mixture and then feeding the same dimerization mixture.

In case ethylene and propylene are copolymerized in the presence of a mixture obtained by catalytic dimerization of butadiene containing cyclooctadiene-1, 5 and 4-vinylcyclohexene-1 in the ratio of 4:1, with the aid of a catalytic system consisting of the reaction product between an aluminum alkyl and a soluble vanadium compound like $VCl_4$, the approximate ratio between the relative reactivities of ethylene, propylene, cyclohexadiene and vinylcyclohexene is $$1:0.1:0.013:0.004$$

If a copolymer containing 5% of dienes by mols and equimolecular amounts of ethylene and propylene is desired, the relative molar concentrations of ethylene, propylene, cyclooctadiene and vinylcyclohexene should be:

$$47.5:47.5:4:1$$

In order to obtain a copolymer having such a composition, however, an initially liquid-feeding mixture should contain ethylene, propylene, cyclooctadiene and vinylcyclohexene in relative molar concentrations of $$4.5:45:27:23$$

Then when the reaction is started, a liquid mixture will be fed into the mixture in which the relative molar concentrations of ethylene, propylene, cyclooctadiene and vinylcyclohexene are the same as in the copolymer, namely 47.5:47.5:4:1.

By using a process of the latter type, stationary conditions are immediately reached in the reactor. In order to obtain amorphous copolymers of ethylene and at least two dienes it is necessary to introduce, however, into the copolymer a diene content higher than 20% by mols.

In order to obtain amorphous copolymers consisting of ethylene, propylene and two or more dienes belonging to the aforementioned classes, a molar ratio of ethylene to propylene lower than or at most equal to 1:4 should be kept in the reacting liquid phase corresponding to a molar ratio of ethylene to propylene of 1:1 under normal conditions in the gaseous phase. Molar ratios in the liquid phase of 1:200 to 1:4 are satisfactory. If, on the contrary, butene-1 is used instead of propylene, the molar ratio of ethylene to butene must be lower than or at most equal to 1:20. The corresponding molar composition under normal conditions in the gaseous phase is 1:1.5. Molar ratios in the liquid phase of 1:1000 to 1:20 are satisfactory.

Under these conditions amorphous terpolymers are obtained which contain less than about 75% by moles of ethylene. If these values are exceeded the copolymer presents a crystallinity of the polyethylenic type.

The lower limit of the ethylene content is not critical, however it is preferable for the copolymers to contain at least 5% by moles of ethylene. The alpha-olefin content in the amorphous copolymers may vary from a minimum of 5% by moles up to a maximum content of 95% by moles. The total diene content of the copolymer preferably ranges from 0.1 to 20% by mols. This upper limit can be raised but especially for economic reasons it is not convenient to introduce into the copolymer a total diene content higher than 20% by mols.

The copolymers of this invention have the properties of nonvulcanized elastomers, since they have a very low initial modulus of elasticity and a very high elongation at break. The presence of unsaturations in the macromolecules forming these copolymers makes it possible to vulcanize them with the methods normally used for unsaturated rubbers, more particularly for low unsaturation rubbers.

The vulcanized products have a high reversible elastic elongation and more particularly if reinforcing fillers such as carbon black are used in the mixture, they also show a high tensile strength.

The elastomers obtained by vulcanization of the copolymers according to the present invention, due to their high mechanical characteristics, can advantageously be used in the preparation of various manufactured articles, such as shaped articles, pipes, sheets, tires, elastic fibers, etc. Petroleum oils can be used generally as extenders or plasticizers. Paraffinic and naphthenic oils are preferred; aromatic oils can be used also.

*Example 1*

The reaction apparatus comprises a glass cylinder having a diameter of 7.5 cm. and a capacity of 1000 cc. provided with an agitator and gas inlet and outlet tubes, immersed in a thermostatic bath at $-20°$ C. The gas inlet tube reaches the bottom of the cylinder and ends with a porous diaphragm (diameter 3.5 cm.).

Into the reactor, kept under nitrogen, 700 cc. of n-heptane and 50 cc. of a mixture obtained from catalytic dimerization of butadiene, containing cis, cis cyclooctadiene-1,5 and 4-vinylcyclohexene-1 in the volumetric ratio of 4:1 were introduced.

Through the gas inlet tube a gaseous mixture of propylene and ethylene in the molar ratio of 2:1 was introduced and circulated at the rate of 200 N liters/hour.

In a 100-cc. flask, kept at $-20°$ C., the catalyst was preformed under nitrogen by reacting 1 millimol of vanadium tetrachloride and 5 millimols of aluminum diethyl monochloride in 30 cc. of anhydrous n-heptane. The catalyst thus preformed was siphoned into the reactor under nitrogen pressure.

The gaseous ethylene-propylene mixture was continuously fed at the flow-rate of 400 N liters/hour. After 16 minutes from the beginning the reaction was stopped by adding 20 cc. of methanol containing 0.1 g. of phenyl-beta-naphthylamine.

The product was purified in a separating funnel, under nitrogen, by repeated treatments with diluted hydrochloric acid and then with water and was finally coagulated in acetone.

After vacuum drying, 38 grams of the solid product were obtained which was amorphous by X-ray examination, had the appearance of a non-vulcanized elastomer, and was completely soluble in boiling n-heptane. The intrinsic viscosity of the product determined in toluene at 30° C. was 2.3.

The infrared spectrum of the product showed the presence of bands, attributable to the presence of vinylcyclohexane (band at 15.25 microns), and an ethylene-propylene molar ratio of 1:1.

The determination of cyclooctadiene in the copolymer was carried out by radiochemical analysis, in comparison with a test carried out on a monomeric mixture artificially prepared with radioactive cyclooctadiene. The Mooney viscosity of the polymer at 100° C. is 53.5 (ML 4:1).

100 parts by weight of the copolymers were mixed in a laboratory roll mixer with 50 parts of carbon black HAF, 1 part of phenyl-beta-naphthylamine, 2 parts of sulfur, 3 parts of zinc dioxide, 1 part of tetramethylthiuram disulphide and 0.5 parts of mercaptobenzothiazole. This mix was vulcanized in a press for 30 minutes at 150° C.

A vulcanized lamina having the following characteristics was obtained:

| | |
|---|---|
| Tensile strength _____kg./cm.$^2$__ | 220 |
| Elongation at break _____percent__ | 340 |
| Modulus at 300% _____kg./cm.$^2$__ | 186 |
| Permanent set at break _____percent__ | 8 |

*Example 2*

700 cc. of anhydrous n-heptane and 80 cc. of a mixture containing 4-vinyl-cyclohexene-1 and cis,cis cyclooctadiene-1,5 in volume ratio of 1:1 were introduced into the apparatus described in Example 1, and held at $-20°$ C.

Through the gas inlet tube a gaseous mixture of propylene and ethylene in the molar ratio of 2:1 was introduced and circulated at the rate of 200 N liters/hour.

In a 100-cc. flask kept under nitrogen, the catalyst was preformed at $-20°$ C. by reacting 1 millimole of vanadium tetrachloride and 5 millimols of aluminum diethyl monochloride in 30 cc. of anhydrous n-heptane. The catalyst thus preformed was siphoned into the reactor under nitrogen pressure. The propylene-ethylene mixture was continuously fed and discharged at the rate of 400 N liters/hour.

After 1 hour from the beginning the reaction was stopped by adding 20 cc. of methanol containing 0.1 g. of phenyl-beta-naphthylamine. The product was purified and isolated as described in Example 1. After vacuum drying, 21 grams of the solid product were obtained which was amorphous by X-ray examination, had the appearance of a non-vulcanized elastomer, and was completely soluble in boiling n-heptane.

The copolymer was vulcanized by using the components and the process of Example 1.

A vulcanized lamina having the following characteristics was obtained:

| | |
|---|---|
| Tensile strength _____kg./cm.$^2$__ | 305 |
| Elongation at break _____percent__ | 540 |
| Modulus at 300% _____kg./cm.$^2$__ | 125 |
| Permanent set at break _____percent__ | 14 |

*Example 3*

200 cc. of anhydrous n-heptane and 25 cc. of a mixture consisting of trans-1,2-divinylcyclobutane and 4-vinyl-cyclohexene-1 in a volume ratio of 1:4 (head fraction of the mixture obtained by thermal dimerization of butadiene) were introduced into an apparatus similar to that described in Example 1, but having a capacity of 700 cc. and a diameter of 5.5 cm., and kept at $-20°$ C.

Through the gas inlet tube a gaseous mixture of propylene and ethylene in the molar ratio of 2:1 was introduced and circulated at the rate of 200 N liters/hour.

In a 100-cc. flask kept under nitrogen the catalyst was preformed at $-20°$ C. by reacting 2 millimols of vanadium tetrachloride and 10 millimols of aluminum diethyl monochloride in 30 cc. of anhydrous n-heptane. The catalyst thus preformed was siphoned into the reactor under nitrogen pressure. The propylene-ethylene mixture was continuously fed and discharged at the rate of 400 N liters/hour.

After 37 minutes from the beginning, the reaction was stopped by addition of 20 cc. methanol containing 0.1 g. of phenyl-beta-naphthylamine.

The product was purified and isolated as described in Example 1. After vacuum drying, 19 grams of the solid product was obtained which was amorphous by X-ray examination, had the appearance of a non-vulcanized elastomer and was completely soluble in boiling n-heptane. The intrinsic viscosity of the product determined in toluene at 30° C. was 2.5.

In the infrared spectrum, bands were observed at 10 and 11 microns, attritutable to vinyl groups, and to the cyclobutane rings. The band at 15.25 microns was due to the presence of vinylcyclohexene. The ethylene/propylene molar ratio in the copolymer obtained was 1:1.

100 parts by weight of copolymer were mixed in a laboratory roll mixer with 1 part of phenyl-beta-naphthylamine, 2 parts of sulfur, 1 part of tetramethylthiuram disulphide and 0.5 parts of mercaptobenzathiazole. The mix obtained was vulcanized in a press at 150° C. for 30 minutes.

A vulcanized lamina having the following characteristics was obtained:

Tensile strength _____ kg./cm.² __ 25
Elongation at break _____ percent __ 400
Modulus at 300% _____ kg./cm.² __ 10
Permanent set at break _____ percent __ 40

Example 4

100 cc. of anhydrous n-heptane and 100 cc. of a monomeric mixture obtained by thermal dimerization of butadiene, containing about 5 parts by volume of trans-1,2-divinyl-cyclobutane, 91 parts by volume of 4-vinylcyclohexene-1 and 4 parts by volume of cis,cis cyclooctadiene-1,5 were introduced into the apparatus described in Example 3, and held at —20° C.

Through the gas inlet tube a gaseous mixture of propylene and ethylene in the molar ratio of 2:1 was introduced and circulated at the rate of 200 N liters/hour.

In a 100-cc. flask kept under nitrogen the catalyst was preformed at —20° C. by reacting 2 millimols of vanadium tetrachloride and 10 millimols of aluminum diethylmonochloride in 30 cc. of anhydrous n-heptane. The catalyst thus preformed was siphoned into the reactor under nitrogen pressure. The propylene-ethylene mixture was continuously fed and discharged at the rate of 400 N liters/hour.

After 24 minutes from the beginning, the reaction was stopped by adding 20 cc. of methanol containing 0.1 g. of phenyl-beta-naphthylamine. The product was purified and isolated as described in Example 1. After vacuum drying, 10 grams of the solid product were obtained which was amorphous by X-ray examination, had the appearance of a non-vulcanized elastomer, and was completely soluble in boiling n-heptane.

In the infrared spectrum, bands at 10 and 11 microns were visible. These were attributable to the presence of vinyl groups, with the band at 15.25 microns being due to the presence of vinylcyclohexene. The presence of cyclooctadiene in the copolymer had been determined as described in Example 1.

The copolymer was vulcanized by using the composition and the process steps described in Example 3.

A vulcanized lamina having the following characteristics was obtained:

Tensile strength _____ kg./cm.² __ 28
Elongation at break _____ percent __ 420
Modulus at 300% _____ kg./cm.² __ 12
Permanent set at break _____ percent __ 4

Example 5

100 cc. of heptane and 100 cc. of a mixture obtained by thermal dimerization of butadiene, containing about 3 parts by volume of trans-1,2-divinylcyclobutane, 93 parts by volume of 4-vinylcyclohexene-1 and 4 parts by volume of cis-cis-cyclooctadiene-1,5, were introduced into the reaction apparatus described in Example 3, and held at —20° C.

Through the gas inlet tube a gaseous mixture of propylene and ethylene in the molar ratio of 2:1 was introduced and circulated at the rate of 200 N liters/hour.

In a 100-cc. flask, kept under nitrogen, the catalyst was preformed by operating at the temperature of —20° C. and reacting 2 millimols of vanadium tetrachloride and 5 millimols of aluminum trihexyl in 30 cc. of anhydrous n-heptane. The catalyst thus prepared was siphoned into the reactor under nitrogen pressure.

The gaseous propylene-ethylene mixture was continuously fed and discharged at the rate of 400 N liters/hour. After 15 minutes from the beginning the reaction was stopped by adding 20 cc. of methanol containing 0.1 g. of phenyl-beta-naphthylamine.

The product was purified and isolated as described in Example 1. After vacuum drying, 12 grams of the solid product were obtained which was amorphous by X-rays examination, completely soluble in boiling n-heptane and had the appearance of a non-vulcanized elastomer.

In the infrared spectrum bands were visible at 10 and 11 microns due to the presence of vinyl groups. The band at 15.25 microns was due to the presence of vinyl cyclohexene. The determination of cyclooctadiene in the copolymer was carried out as described in Example 1.

The copolymer was vulcanized by using the composition and the process steps of Example 3.

A vulcanized lamina having the following characteristics was obtained:

Tensile strength _____ kg./cm.² __ 33
Elongation at break _____ percent __ 500
Modulus at 300% _____ kg./cm.² __ 13
Permanent set at break _____ percent __ 10

Example 6

200 cc. of anhydrous n-heptane and 28 cc. of a mixture consisting of trans-1,2-divinylcyclobutane and 4-vinylcyclohexene-1 in the ratio of 1:3 by volume (head fraction of the mixture obtained by thermal dimerization of butadiene) were introduced into the reactor of Example 3, and held at —20° C.

Through the gas inlet tube a gaseous propylene-ethylene mixture in the molar ratio of 4:1 was introduced and circulated at the rate of 200 N liters/hour.

In a 100-cc. flask, kept at —20° C. under nitrogen, the catalyst was preformed by reacting 2.8 millimols of vanadium triacetylacetonate and 14 millimols of aluminum diethyl monochloride in 30 cc. of anhydrous toluene. The catalyst thus preformed was siphoned into the reactor under nitrogen pressure. The gaseous ethylene-propylene mixture was continuously fed and discharged at the rate of about 400 N liters/hour.

After 15 minutes from the beginning a further catalyst amount, equal to the preceding one, was preformed and siphoned into the reactor.

After 1 hour from the beginning, the reaction was stopped by adding 20 cc. of methanol containing 0.1 g. of phenyl-beta-naphthylamine.

The product was purified and isolated as described in Example 1. After vacuum drying, 8 grams of the solid product were obtained which was amorphous by X-ray examination, completely soluble in boiling n-heptane, and had the appearance of a non-vulcanized elastomer.

In the infrared spectrum, bands were present at 10 and 11 microns attributable to the vinyl groups. The band at 15.25 microns was due to the presence of vinylcyclohexene. The propylene-ethylene molar ratio was about 1.

The copolymer was vulcanized by using the composition and the process steps described in Example 3.

A vulcanized lamina having the following characteristics was obtained:

Tensile strength _____ kg./cm.² __ 15
Elongation at break _____ percent __ 540
Modulus at 300% _____ kg./cm.² __ 9
Permanent set at break _____ percent __ 10

Example 7

700 cc. of anhydrous n-heptane, 20 cc. of 4-vinyl-cyclohexene-1, 15 cc. of radioactive cyclooctadiene-1,5 and 15 cc. of 1,2,4-trivinylcyclohexane were introduced into the apparatus described in Example 1, and held at —20° C.

Through the gas inlet tube a gaseous mixture of butene-1 and ethylene in the molar ratio of 3:1 was introduced and circulated at the rate of 200 N liters/hour.

In a 100 cc. flask kept under nitrogen, the catalyst was preformed at —20° C. by reacting 2 millimols of vanadium tetrachloride and 10 millimols of aluminum diethyl monochloride in 30 cc. of anhydrous n-heptane. The catalyst thus preformed was siphoned into the reactor by means of nitrogen pressure.

The butene-1/ethylene mixture was continuously fed and discharged at the rate of 400 N liters/hour.

After 20 minutes from the beginning, the reaction was stopped by adding 20 cc. of methanol containing 0.1 g. of phenyl beta-naphthylamine. The product was purified and isolated as described in Example 1. After vacuum drying, 11 grams of the solid product were obtained which was amorphous by X-ray examination, looked like a non-vulcanized elastomer and was completely soluble in boiling n-heptane.

The radiochemical analysis showed the presence of about 1% by weight of cyclooctadiene. The infrared spectrographic examination showed the presence of methylenic sequences of various lengths (zone between 13 and 13.8 microns), of methyl groups (band at 7.25 microns), of vinyl groups (bands at 10 and 11 microns) and the band at 15.25 microns, attributable to the presence of vinyl cyclohexene.

The copolymer was vulcanized by using the composition and the process steps of Example 1.

A vulcanized lamina having the following characteristics was obtained:

| | | |
|---|---|---|
| Tensile strength | kg./cm.$^2$ | 26 |
| Elongation at break | percent | 480 |
| Modulus at 300% | kg./cm.$^2$ | 12 |

While the above has been described in detail, particularly with respect to the examples, it is understood that other variations and modifications may be made without departing from the true spirit of the invention.

What is claimed is:

1. Vulcanizable, substantially linear, amorphous copolymers having a molecular weight above 20,000 consisting essentially of:
   (1) ethylene, in an amount from at least 5% to not more by 75% by mols,
   (2) a higher alpha-olefin selected from the group consisting of propylene and butene-1, in an amount from at least 5% to not more than 95% by mols, and,
   (3) at least two additional monomers obtained from the dimerization of butadiene in an amount from about 0.1 to 20% by mols, selected from the group consisting of cyclooctadiene-1,5, 4-vinyl cyclohexene-1, and divinyl cyclobutane, said copolymers consisting essentially of unsaturated macromolecules having randomly distributed copolymerized units of each of the starting monomers.

2. Copolymers according to claim 1, further characterized in that the additional monomeric units consist essentially of 4-vinyl cyclohexene-1 and cis,cis-cyclooctadiene-1,5.

3. Copolymers according to claim 1, further characterized in that the additional monomeric units consist essentially of trans-1,2-divinylcyclobutane and 4-vinylcyclohexene-1.

4. Copolymers according to claim 1, further characterized in that the additional monomeric units consist essentially of trans-1,2-divinylcyclobutane, 4-vinylcyclohexene-1, and cis,cis-cyclooctadiene-1,5.

5. A copolymer of claim 1, sulfur-cured to an elastomeric vulcanizate.

6. The process for preparing the vulcanizable, substantially linear copolymers of claim 1 which comprises reacting a mixture of the selected monomers, in liquid phase, at a temperature of between about −80° C. and about +125° C. in contact with a catalyst obtained by mixing:
   (1) a vanadium compound selected from the group consisting of
      (a) vanadium halides and vanadium oxyhalides, and
      (b) vanadium compounds in which at least one of the vanadium valences is satisfied by a heteroatom selected from the group consisting of oxygen and nitrogen linked to an organic group, with
   (2) a second catalyst-forming component selected from the group consisting of organometallic compounds of metals belonging to Groups I to III inclusive of the Mendeléeff Periodic Table, hydrides of said metals, complex organometallic compounds of said metals, and complex hydrides of said metals, the second catalyst-forming component (2) containing halogen at least when component (1) is a vanadium compound of type (b).

7. The method of claim 6 further characterized in that an organometallic compound of a metal selected from the group consisting of aluminum and beryllium is used.

8. The method of claim 6 further characterized in that a lithium aluminum complex organo-metallic compound is used.

9. The method of claim 6 further characterized in that the polymerization and the preparation of the catalyst are carried out at temperatures ranging from 0 to −80° C.

10. The method of claim 6 further characterized in that the catalyst is obtained by mixing a vanadium compound selected from the group consisting of vanadium triacetylacetonate, vanadium alkoxides and vanadium haloalkoxides, and an aluminum alkyl halide, at a temperature ranging between 0° and +125° C., and the mixed monomers are copolymerized in contact with said catalyst at a temperature in said range, and in the presence of from about 0.05 to 1.0 mole per mole of alkyl aluminum halide, of a complexing agent.

References Cited by the Examiner

UNITED STATES PATENTS

| | | | |
|---|---|---|---|
| 2,809,372 | 10/1957 | Frederick et al. | 260—85.3 |
| 2,933,480 | 4/1960 | Gresham et al. | 260—80.5 |
| 3,050,470 | 8/1962 | Pearson et al. | 260—94.9 |
| 3,050,471 | 8/1962 | Anderson et al. | 260—94.9 |
| 3,058,963 | 10/1962 | Vandenberg | 260—94.9 |
| 3,166,517 | 1/1965 | Ro | 260—80.5 |

FOREIGN PATENTS 776,326  6/1957  Great Britain.

OTHER REFERENCES

Reed (I), J. Chem. Soc. (London), 1951, 685f.
Reed (II), J. Chem. Soc. (London), 1954, 1931f.

JOSEPH L. SCHOFER, *Primary Examiner.*

W. HOOVER, *Assistant Examiner.*

UNITED STATES PATENT OFFICE
CERTIFICATE OF CORRECTION

Patent No. 3,310,537                                    March 21, 1967

Giulio Natta et al.

It is hereby certified that error appears in the above numbered patent requiring correction and that the said Letters Patent should read as corrected below.

Column 2, line 11, for "107,106" read -- 701,106 --; column 4, lines 65 to 69, the formula should appear as shown below instead of as in the patent:

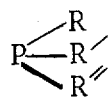

column 5, line 16, for "polymerization" read -- copolymerization --; line 40, for "carried" read -- caried --; column 9, line 6, for "40" read -- 4 --; column 12, line 10, for "hereto" read -- hereo --.

Signed and sealed this 28th day of November 1967.

(SEAL)
Attest:

EDWARD M. FLETCHER, JR.                         EDWARD J. BRENNER
Attesting Officer                              Commissioner of Patents